(12) United States Patent
Korala (10) Patent No.: US 7,747,527 B1
(45) Date of Patent: Jun. 29, 2010

(54) APPARATUS AND METHOD FOR PROVIDING TRANSACTION SERVICES

(75) Inventor: Aravinda Korala, Edinburgh (GB)

(73) Assignee: Korala Associates Limited, Edinburgh (GB)

( * ) Notice: Subject to any disclaimer, the term of this patent is extended or adjusted under 35 U.S.C. 154(b) by 0 days.

(21) Appl. No.: 09/646,796

(22) PCT Filed: Mar. 24, 1999

(86) PCT No.: PCT/GB99/00927

§ 371 (c)(1), (2), (4) Date: Nov. 21, 2000

(87) PCT Pub. No.: WO99/49431

PCT Pub. Date: Sep. 30, 1999

(30) Foreign Application Priority Data

Mar. 24, 1998 (GB) ................... 9806843.0

(51) Int. Cl.
*G06Q 40/00* (2006.01)

(52) U.S. Cl. ............... 705/43; 705/35; 705/42

(58) Field of Classification Search ............ 705/14, 705/16, 21, 35, 39, 41.43, 44, 64, 65, 67, 705/72, 38, 42, 43
See application file for complete search history.

(56) References Cited

U.S. PATENT DOCUMENTS

| | | | |
|---|---|---|---|
| 5,710,887 A | | 1/1998 | Chelliah et al. |
| 5,739,512 A | | 4/1998 | Tognazzini |
| 5,761,071 A | | 6/1998 | Bernstein et al. |
| 5,826,267 A | | 10/1998 | McMillan |
| 5,903,881 A | * | 5/1999 | Schrader et al. ............... 705/42 |
| 5,991,410 A | * | 11/1999 | Albert et al. ................... 705/78 |
| 6,003,019 A | * | 12/1999 | Eaton et al. .................... 705/42 |
| 6,006,252 A | * | 12/1999 | Wolfe ......................... 709/203 |
| 6,078,848 A | | 6/2000 | Bernstein et al. |
| 6,118,860 A | * | 9/2000 | Hillson et al. ................ 379/155 |
| 6,856,974 B1 | * | 2/2005 | Ganesan et al. ............... 705/40 |

FOREIGN PATENT DOCUMENTS

| | | |
|---|---|---|
| WO | WO 97 05582 A | 2/1997 |
| WO | WO-97/10562 | 3/1997 |
| WO | WO 97 10562 A | 3/1997 |

(Continued)

OTHER PUBLICATIONS

CA, NCR banking on bundling deal Moltzen, Edward F. Computer Reseller News. Jan 20, 1997. p. 20 (1 page).*

(Continued)

*Primary Examiner*—Lalita M Hamilton
(74) *Attorney, Agent, or Firm*—Merek, Blackmon & Voorhees, LLC (57) ABSTRACT

Apparatus and method for providing transaction services, in particular a computer-based transaction machine, such as an ATM, and a method for providing transaction services using said transaction machine. One or more software applications interact with middleware software through functional interfaces that are hardware independent but provide functionality which is implemented in a manner adapted to the capabilities of the particular hardware implementation. Objects provided for standard transaction functions are independent of the interface between the user and the transaction machine, said interface being customizable. The resulting transaction machines are typically combined into networks and these networks may readily be combined to form an Extranet.

71 Claims, 2 Drawing Sheets

FOREIGN PATENT DOCUMENTS

WO     WO 97 41541 A     11/1997
WO     WO 97 45796 A     12/1997

OTHER PUBLICATIONS

TP-monitor vendors spin Web features Leon, Mark. InfoWorld. San Mateo: Jul. 1, 1996. vol. 18, Iss. 27; p. 37, 1 pgs.*

European Search Report dated Jul. 22, 2005, issued in corresponding application No. 99 911 945.6.

XP009050602: B. Meyer, 1997, "Object-Oriented Software Construction," Second Edition, Prentice Hall PTR, ISBN 0-13-629155-4, pp. 1136-1137.

XP001206895: CEN, Dec. 1998, Extensions for Financial Services (XFS), interface specification—Part 1: Application Programming Interface (API)—Service Provider Interface (SPI)—Programmer's Interface, CWA 13449-1.

* cited by examiner

APPARATUS AND METHOD FOR PROVIDING TRANSACTION SERVICES

BACKGROUND OF THE INVENTION

The present invention relates to apparatus and a method for providing transaction services. In particular it relates to networked computer-based transaction machines and a method for providing transaction services using said transaction machines.

Transaction machines are herein defined as any computer-based machine able to interact with a user.

The term ATM is used herein to refer to any transaction machine able to dispense cash. Typically, such machines can also undertake physical transactions such as inputting information through a keypad or touch screen, making sounds, producing video and printing. They might also be able to read bank cards and such like. Kiosks are transaction machines unable to dispense cash, but otherwise able to provide a range of interactive features, often relating to financial services. For test purposes, a conventional PC may be used as a transaction machine.

Electronic cash machines are a large and rapidly growing market. Many different hardware providers produce equipment for this market such as the machines themselves, the servers to which they connect and the networking means through which they typically communicate. Furthermore, many different operating systems and applications are used both for operating and developing these systems.

As a result of the complexity and diversity of hardware and software currently being used in this field, it is difficult and expensive to alter these systems to extend their functionality, upgrade to newer and better hardware, software or networking means or to interface with other systems. As it is difficult to make even small changes to complex systems without running the risk of their malfunctioning, the evolution of such systems is slow.

It would therefore be advantageous to find a way of making it easier to alter the hardware, software and network components of ATMs/kiosks, their servers and their networking means.

Furthermore, it would be advantageous to provide a means for enabling such changes to be implemented in small stages.

Yet further, it would be advantageous to find a way to reduce the risk of such systems malfunctioning.

In current practice, it is difficult and therefore expensive to operate ATM/kiosk networks containing diverse hardware, software and networking means. Often large amounts of hardware and software must be upgraded concomitantly to reduce interface problems. Furthermore, it is difficult to interface networks of dissimilar devices, perhaps belonging to different organisations. If dissimilar ATM/kiosk systems could be readily interfaced, forming a so-called Extranet, new and useful co-operative applications could be developed which, although currently possible, are prohibitively complex and expensive at the present time.

It would therefore be advantageous to provide a better means of networking ATMs/kiosks which use diverse hardware, software and networking implementations. In particular, it would be advantageous to provide a means of allowing co-operation between dissimilar networks. Furthermore, it would be advantageous to reduce the amount of work required to enable ATM/kiosk applications to run on dissimilar hardware implementations.

At the present time, there is a rapid growth in electronic commerce (e-commerce), usually conducted over the internet. E-commerce is being limited by difficulties gaining access to the Internet for many consumers and due to the limitations of the machines currently used by consumers for Internet transactions. A typical e-commerce consumer will access a web site using a home PC. However, home PCs lack facilities such as the ability to dispense cash or read a smartcard which are important in many types of common financial transaction.

It would therefore be desirable to provide a means of allowing internet-based e-commerce to be accessed from ATMs and kiosks which already have hardware facilities suitable for financial transactions. This would allow e-commerce services to be provided which required expensive or high-security hardware facilities which cannot be securely provided at a reasonable cost on privately owned web browsers. Furthermore, it would be possible for e-commerce to be made readily available to a much larger base of consumers than is currently available.

The design of ATM networks typically involves input from numerous professionals such as software and hardware engineers specialising in the various systems, applications and communications means, graphics and GUI specialists, language specialists and so forth. In current working practice these specialists are highly dependent on each other and much time and money is spent communicating different requirements amongst people working on diverse areas of a project.

BRIEF SUMMARY

It would therefore be advantageous to provide a means by which the different specialists working on a project may work more independently. In particular, it would be highly advantageous to provide a means by which the different specialists may customise elements of the application pertaining to their own specialisation without affecting other elements of the application. It would be particularly advantageous if the different specialists were able to use well known prior art authoring tools to prepare aspects of the application. According to the present invention there is provided a method for providing transaction services wherein (a) the user of the transaction services interacts with a computer-based transaction machine which is controlled by one or more software applications;
(b) the software applications interact with the functional interfaces of middleware software, which extends the functionality of an underlying operating system; and
(c) said functional interfaces provide functionality which is implemented in a manner adapted to the particular hardware capabilities of the transaction machine.

The computer-based transaction machine may be selected from a group which comprises automatic teller machines, kiosks, electronic point of sale machines and the like.

Preferably, the middleware software comprises a series of transaction objects and controls for standard device functions.

More preferably, transaction objects are independent of the interface between the user and the transaction machine; the interface between the user and the transaction machine being customisable.

Preferably, the controls implement a capabilities interface.

More preferably, the capabilities interface is able to communicate the capabilities of the control software.

The applications, objects and controls may be fully concurrent and asynchronous.

The controls may have a mode in which events are queued up and delivered to the application on demand.

Preferably, controls can run on the transaction machine even when supported hardware devices are not present.

More preferably, the middleware software uses one or more open standards for interacting with different hardware systems.

Preferably, the middleware software only provides cancellation commands for functions which can be successfully cancelled.

The middleware software may only requires a timeout command to be supplied when it is meaningful to do so.

Preferably, all controls are persistent.

More preferably, there is provided a control containing a persistent object.

Preferably, all errors and transgressions are asserted by the middleware software.

Preferably, the middleware software provides a trace facility that is always enabled and which logs trace events.

The middleware software may use a ring buffer to store a log of trace events.

Preferably, the middleware software writes trace data to memory and then copies it to disk only when the transaction machine is idle.

Preferably, one or more software applications are hosted in a web browser.

More preferably, the use of a web browser provides support for software distribution and network connections.

An additional browser frame may be provided which contains the device controls required to detect events which must be dealt with immediately they occur.

The middleware software may comprise a series of COM components with a scriptable ActiveX® interface.

The middleware software may comprise a series of Javabeans™ components with a scriptable interface.

The use of a web browser may allow conventional web sites to be displayed by the computer-based transaction machine.

Preferably, the middleware software allows or disallows access to particular web sites according to a rule database.

The middleware software may be adapted to customise time-out of the display of individual internet web sites.

Preferably, said computer-based transaction machine is adapted to allow the software applications and middleware to be altered across a network by an authority.

More preferably, the transaction machine communicates information about its status to a remote monitoring station across a network.

According to a second aspect of the present invention, there is provided a computer-based transaction machine; wherein said computer-based transaction machine is provided with hardware devices for interaction with users and the exchange of transaction-related information with other machines; wherein said computer-based transaction machine is controlled by one or more software applications; wherein said software applications control hardware devices through functional interfaces with middleware software; wherein said middleware software extends the functionality of an underlying operating system and wherein said functional interfaces are hardware independent but provide functionality which is implemented in a manner adapted to the capabilities of the particular hardware devices which are provided.

The computer-based transaction machine may be selected from a group which comprises automatic teller machines, kiosks, electronic point of sale machines and the like.

Preferably, the middleware software comprises a series of transaction objects and controls for standard device functions.

More preferably, transaction objects are independent of the interface between the user and the transaction machine; the interface between the user and the transaction machine being customisable.

Preferably, the controls implement a capabilities interface.

More preferably, the capabilities interface is able to communicate the capabilities of the control software.

The applications, objects and controls may be fully concurrent and asynchronous.

The controls may have a mode in which events are queued up and delivered to the application on demand.

Preferably, controls can run on a transaction machine even when supported hardware devices are not present.

More preferably, the middleware software uses one or more open standards for interacting with different hardware systems.

Preferably, the middleware software only provides cancellation commands for functions which can be successfully cancelled.

The middleware software may only requires a timeout command to be supplied when it is meaningful to do so.

Preferably, all controls are persistent.

More preferably, there is provided a control containing a persistent object.

Preferably, all errors and transgressions are asserted by the middleware software.

Preferably, the middleware software provides a trace facility that is always enabled and which logs trace events.

The middleware software may use a ring buffer to store a log of trace events. Preferably, the middleware software writes trace data to memory and then copies it to disk only when the transaction machine is idle.

Preferably, one or more software applications are hosted in a web browser.

More preferably, the use of a web browser provides support for software distribution and network connections.

An additional browser frame may be provided which contains the device controls required to detect events which must be dealt with immediately they occur.

The middleware software may comprise a series of COM components with a scriptable ActiveX® interface.

The middleware software may comprise a series of Javabeans™ components with a scriptable interface.

The use of a web browser may allow conventional web sites to be displayed by the computer-based transaction machine.

Preferably, the middleware software allows or disallows access to particular web sites according to a rule database.

The middleware software may be adapted to customise time-out of the display of individual internet web sites.

Preferably, the computer-based transaction machine is adapted to allow the software applications and middleware to be altered across a network by an authority.

More preferably, the transaction machine can communicate information about their status to a remote monitoring station across a network.

According to a third aspect of the present invention there is provided a network comprising a plurality of computer-based transaction machines, one or more networking means and one or more application servers.

According to a fourth aspect of the present invention, there is provided an Extranet formed by combining a plurality of networks of computer-based transaction machines.

Preferably, the Extranet is provided with a security mechanism which limits the hardware functionality available to individual software applications.

BRIEF DESCRIPTION OF THE DRAWINGS

An example embodiment of the present invention, referred to as the system, will now be described with reference to the following Figures wherein.

DETAILED DESCRIPTION

Figure 1:
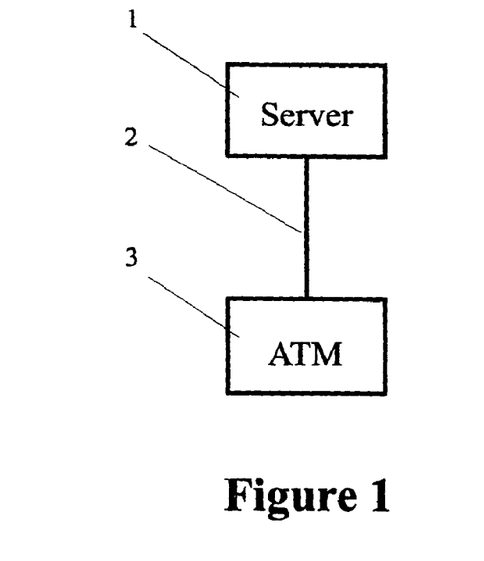
FIG. 1 shows a simple ATM network.
Figure 2:
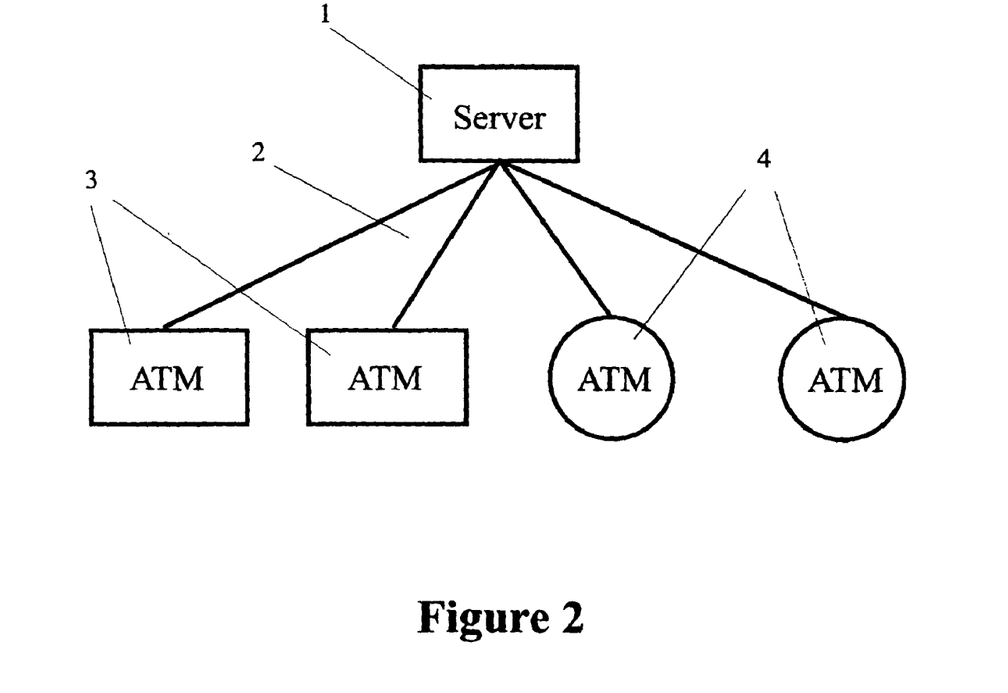
FIG. 2 shows an ATM network with diverse hardware.

FIG. 1 shows a simple ATM network comprising a server 1, a networking means 2 and an ATM 3. The system is designed to operate such networks and also more complex networks such as shown in FIG. 2 wherein there may be ATMs of different functionality, here labelled 4.

Figure 3:
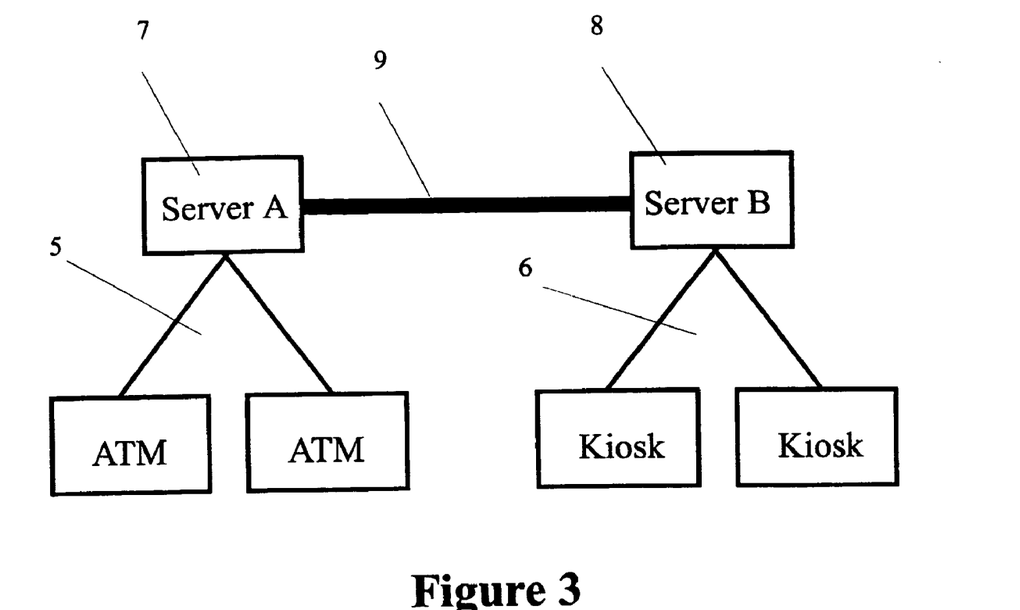
FIG. 3 shows two distinct networks being combined to form an Extranet.

A particular benefit of the system is its ability to allow distinct networks to operate together as shown in FIG. 3. Here, two distinct networks 5 and 6 operated by distinct servers 7 and 8 are connected 9. The resulting joined network is referred to as an Extranet.

By joining multiple networks together, it becomes possible for different organisations to co-operate in the provision of ATM/kiosk network services. For example, suppose that a bank which owned a series of conventional ATMs and an airline which owned a series of ticketing kiosks chose to co-operate. There exists the potential for the bank's ATMs to both allow customers to pay for an airline ticket and to print out that ticket. Similarly, the airline might offer a limited selection of banking services, such as balance display, which are compatible with the functionality of their kiosks.

Using prior art, the development of such a system would be complex, particularly due to the different hardware and capabilities of the bank's ATMs and the airline's kiosks. Such co-operation between organisations is by no means impossible at the present time, but is currently rare due to the complexity and expense required for implementation.

In general, the system provides a means for a plurality of servers to operate a plurality of ATMs and kiosks using a plurality of networking means. An example application would be to allow consumers to purchase eg cinema, theatre and airline tickets from different organisations through ATMs positioned at convenient locations.

Typically, the networking means will be the internet, a corporate intranet or LAN but may be any networking means or a mixture of networking means.

The system comprises a middleware software layer which extends the function of an underlying operating system and which in turn provides a single programming interface for an ATM/kiosk control application to be written to.

Figure 4:
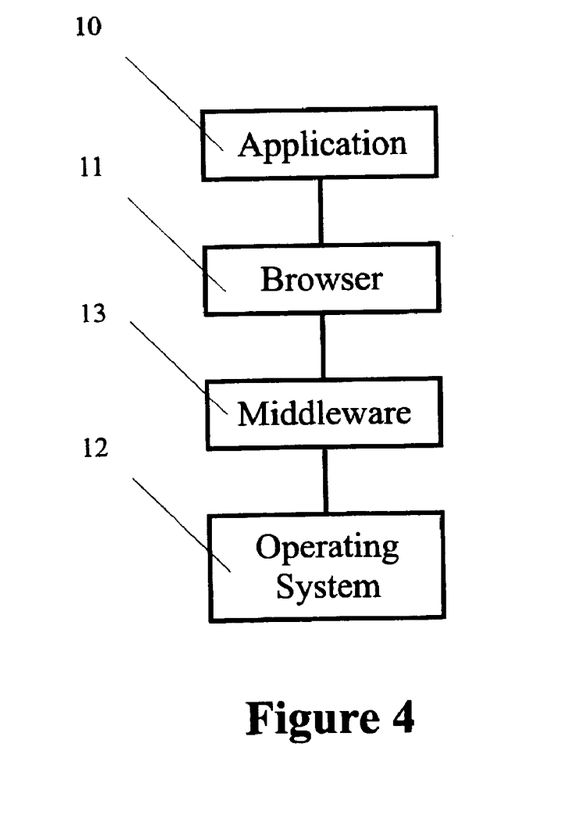
FIG. 4 shows the software architecture of the preferred implementation of the system.

FIG. 4 shows the software architecture of the preferred implementation of the system. An ATM/kiosk control application 10 is hosted in a web browser 11 such as Microsoft®'s Internet Explorer. The application runs on a computer with a particular operating system, 12, such as Windows NT®, the functionality of which has been extended by middleware software 13.

The middleware comprises a series of components and objects, for use by the application, which extend the functionality of the operating system and provide tools to simplify development of the ATM application.

In the preferred implementation all of the system's subsystems are implemented as a series of COM components with an ActiveX® interface or as Javabeans™ with a scriptable interface. This architecture enables applications running within Internet Explorer to access functionality provided by the operating system and the middleware, including access to hardware.

A useful benefit of this implementation is that applications may be prepared using common authoring tools and such as Microsoft®'s FrontPage®, VisualStudio®, Visual Interdev® and common development environments such as Visual Basic®, Visual C++®, Powerbuilder®, Delphi® etc. This means that applications can be prepared with tools with which developers will be familiar and which, due to their popularity, provide facilities and support that would be prohibitively expensive to prepare for a custom development environment.

A further benefit of using browser technology is that they provide an environment in which software download can be readily controlled. The application may be held entirely locally to an ATM/kiosk, entirely on a server or any compromise between these two extremes. The application can be downloaded daily if required.

The system uses the Windows® Open System Architecture Extensions for Financial Services (WOSA XFS) to support ATM hardware in a vendor independent manner.

The system also uses the Object Linking and Embedding for Point Of Sale (OPOS) standard for interacting with different hardware systems. This means that applications can access hardware independent of whether the underlying hardware supports WOSA XFS or OPOS.

The system also supports the PC/SC standard for smartcards, thereby providing a uniform way of accessing smartcards.

Furthermore, the system also provides support for a variety of other open standards such as OFX and SNMP and transaction monitors such as NCR's TOPEND®.

Clearly, support for additional standards may readily be added.

The primary subsystems of the middleware software comprise a series of wizards, device controls, self-service controls, communications controls and status monitoring components.

The top level components are the wizards, which are a series of transaction objects that implement common ATM/kiosk transactions such as dispensing cash, printing a statement etc. In the preferred embodiment, each is implemented as an ActiveX® object or a Javabean™. Whilst wizards are running, they take control of the function of the ATM/kiosk. Wizards interface with other controls and encode all of the top-level control logic.

Applications can be built with the system by customising and combining wizards. Wizards encapsulate all of the features and functionality required by a particular transaction or chunk of application. When using ActiveX® Wizards receive input via ActiveX® properties and methods and output their state as a set of ActiveX® events.

Alternatively the wizard can be implemented in the same way as a Javabean™. As a result of this design feature, the wizard is completely independent of the ATM/kiosk-user interface.

For example, an ATM might have a single button which dispenses $10 on demand. A second ATM might implement more complex controls and display a detailed animation whilst money is issued. However, the same wizard may be used to implement both these ATMs. The wizard encapsulates the essential software logic of the transaction while allowing the user interface to be freely defined by script on the browser page.

This has several important benefits which will lead to time and cost savings: firstly, the encapsulated features within the wizard can be reused between different applications whilst allowing the different applications to have totally different look and feel. Secondly, this allows the user interface to be designed with common web tools. Thirdly, the user interface may be designed without any risk of compromising the function of the wizard. Finally, the user interface may be designed by a specialist who may not be an expert in the other aspects of ATM/kiosk software and hardware.

An additional important feature of the wizards is that they are able to interpret the capabilities of the hardware on which they are run. For example, they may be able to establish whether a cash dispensing means is available. One application may then run on a plurality of different hardware implementations, adapting its functionality to the capabilities of that hardware.

This not only allows different hardware implementations to be incorporated into the same network but allows distinct networks to be joined into an Extranet.

The device controls provide hardware independent access to the special devices on an ATM or kiosk. Each device control acts as a persistent server that can be controlled and interrogated by one or more applications or wizards. A device control abstracts the details of the hardware underneath it and acts as a complete server for that device. Applications and wizards interact with controls through a scriptable ActiveX® interface or a Javabeans™ interface.

Some example device controls supported by the system are device controls for the following types of devices, or device types:
  Camera
  Card Reader (motorized, swipe, DIP, smart cards etc.)
  Cash Acceptor
  Cash Dispenser
  Coin Dispenser
  Depository
  Doors
  Encryptor
  Guide Lights
  Indicators
  Journal Printer
  Keyboards
  Laser Printers
  Modems
  Operator Panel
  Passbook (including page turn)
  Pin Pad
  Receipt Printer
  Scanner
  Sensors
  Signature Capture
  Statement Printer
  Touchscreen
  UPS
  VendorMode
  Weighing Scales Multiple applications may be run simultaneously and device controls are fully concurrent. This is important as the cycle time of ATMs and kiosk transactions can be critical. Their design is such that they can be used in an event-driven manner, with controls reporting their result (success or failure) via ActiveX® or Javabeans™ events, or in a procedural manner from within a language such as C++. In the event-driven mode, applications can be readily created using browser technology; for example, readily available web tools which provide appropriate easy-to-use graphical interfaces can be used to create event-driven applications.

In order to be able to operate asynchronously, all controls create their own thread, called the event thread, when first constructed. When an asynchronous method is called, a command message is sent to the event thread. The event thread carries out the command and sends a message back to the main thread on completion: the completion method causes the appropriate event to be fired. By implementing commands using the event thread, the main application thread is free to process other tasks in parallel. The event thread also ensures that the device states persist from one application page to another: although controls on browser pages are being continually created and destroyed, the event thread remains running and ensures that the connection to the device is never lost.

When controls are run in a procedural manner, from a language such as C++, the controls may be set to a mode in which events are queued up and delivered to the application on demand, allowing the application to carry out other tasks, and return to the event queue at an appropriate time.

The self-service controls provide the functionality necessary for creating self-service applications. Important self-service controls are described further below. The communications controls provide access to the remote host computers. Both the self-service and communications controls have the same server architecture as the device controls and all may be executed asynchronously.

The status monitoring system monitors the health of the ATM or Kiosk and sends status and alert signals to an external monitoring station using SNMP alerts.

All controls implement a capabilities interface, allowing an application or wizard to interrogate the capabilities of the control as well as the device which the control represents.

Therefore, not only can different hardware implementations be integrated into the same network or Extranet, the applications can dynamically configure the services they provide depending on the capabilities of the hardware available on the kiosk.

As a result of this design, individual software components can be upgraded without having to change other aspects of the application. New features can be added without making the application dependent on those features.

Furthermore, hardware and networking components may be upgraded or altered step by step. Due to the modular nature of the system and its customisability, a plurality of communications and hardware implementations may be used at once. This means that an organisation which runs an ATM/kiosk network might use its legacy communications and hardware implementations, perhaps concurrently with Internet/Intranet support. This means that ATM networks may be implemented and altered step-wise.

Such upgrades are particularly easy when using the Open Financial Exchange (OFX) architecture. The middleware software implements a single OFX Control which may interface with an OFX server by any networking means. The OFX server may also interface with a host by any networking means. Once this architecture is implemented, the resulting network topology may be readily altered, making this an easy migration path for existing networks to use this system.

A further implication of the design of the controls is that they can run on an ATM/kiosk even when actual hardware devices are not present. This allows the applications to be started up and run, for example for development and test purposes, without requiring particular hardware. When the application requests the capabilities of a particular control, the control will reply that the device is not present and that the capabilities are null. Therefore it is possible to create and test application on, for example, a PC. In this situation, the PC will behave like an ATM/kiosk in its interactions with the application.

An ignore mode is also provided wherein particular controls will return "success" for every command. This allows the application to use generic code which does not need to test whether the device is present at each step, simplifying the code that needs to be written when creating an application to cope with various hardware capabilities.

An HTML-based application is also provided with the system for testing device controls. This application allows the operator to select a subset of the devices for testing. For each device, two test sequences are defined: one requires operator interaction (e.g. entering/removing a card) and one requires no operator interaction. When the latter is selected, the interaction-free test sequences will be repetitively run for the selected devices, allowing applications provided using this system to be easily stress tested. Complete tests including operator interaction may also be selected. Testing is automated and therefore as reproducible as possible.

All controls include a security mechanism. This mechanism allows the methods of the various controls to be enabled and disabled. This is particularly important in an Extranet environment when applications of differing abilities run on a given kiosk or ATM. For example, if a bank operating a network of ATMs allowed an airline to dispense tickets through its ATMs by way of an Extranet, it would wish to disallow the airline's application from dispensing cash.

This security mechanism is implemented by a key passing technique as follows:

The middleware software contains a security control which allows the current security configuration of an ATM or kiosk to be set. Using the security control, the owner of the ATM or kiosk can specify details of the security configuration (i.e. which methods of a control are allowed and disallowed). Applications identify themselves to the security control via a digital certificate which sets the security configuration as specified by the ATM/kiosk owner. If the application attempts to call a disallowed method of control, a trap is generated, transferring control to the ATM/kiosk owner's application.

An important benefit of the system is that it may readily be used to provide internet based e-commerce facilities through ATMs and kiosks, not only allowing e-commerce facilities to be used by a larger consumer base but also enabling e-commerce which requires expensive or high-security hardware facilities such as cash dispensers or identity verification means that cannot readily be provided on privately owned PCs and web-browsers.

To help enable this, the system provides a Site-Minder control which allows existing web sites to be safely delivered via ATMs and kiosks. This control provides several important features. For example, it monitors the URL of each page of the web-site being delivered and allows or disallows the page according to a rules database. This stops the user from straying into other web-sites or web-pages that are not normally part of the purpose of the ATM/kiosk. The control allows each page to be given a customised time-out which is important as web sites are normally designed for use at home and have different (longer) time-outs than would be appropriate for public ATMs/kiosks. Web pages may be navigated using a touch sensitive screen, making them intuitive and easy to use. The control can also magnify small features on a web page (such as hypertext links and images with links) This magnification can be toggled on and off by the user, thereby animating the hypertext link. This is beneficial firstly because it makes it easier for the user to see where the link is and secondly because it becomes easier for the user to select the link when it is in its magnified state.

An additional feature provided by the system for use with ATMs/kiosks with touchscreens is a "softkeyboard" wherein a keyboard is displayed on the touch screen and contact with the displayed keyboard is interpreted by the system like keystrokes on a real keyboard, thereby removing the need for a physical keyboard to be provided.

One problem commonly faced by web designers is that objects placed on a web page are destroyed when the page is changed. A useful benefit of the middleware is that the ActiveX® hook idea solves this problem—underlying objects remain persistent while lightweight hooks on each page access the object.

Lack of persistence also leads to problems for the application developer in storing application-wide data. A solution to this problem is provided by a scratchpad control which has a persistent object at its core and allows the application to store and retrieve data at any time. This control supports the Vbscript variant type, allowing all types of data to be stored and retrieved. Furthermore, this control allows data to be shared between multiple applications, marking it as shared.

A related problem when implementing web-based ATM applications relates to events which must be dealt with immediately, no matter when the event occurs. For instance, if a safe door is opened, an application may need to shut down immediately. This would not be easy to implement in a web-based environment as every page would have to contain some code to handle the event. This problem can be solved in the system by operating a second, invisible frame alongside the main application frame. The invisible frame contains all the device controls needed to detect the events that must be reacted to. This frame may then take control, perhaps closing down the main frame.

Error handling in traditional ATM applications is difficult. Components may return a large number of error cases, resulting in complex code.

The middleware software separates the responses it sends to the application into "good responses" and error responses. Most commands have a single good response and all errors are mapped to a single error response, although some may have a plurality of good responses. Good responses allow the application to continue. When an error response is returned, the current transaction flow is normally aborted and control flow jumps out of the normal flow process to handle the error situation. The application can then interrogate the control to determine the exact cause of the error.

A benefit of this approach is that normal flow is not cluttered by handlers for each of the error cases which can occur. Control may be transferred to generic error handlers which can either recover from the error or abort the transaction completely, perhaps even rebooting the ATM/kiosk. Application code can therefore remain as clear and concise as possible whilst encouraging the application developer to handle all error cases by calling an error handler. In the development environment, fatal errors result in a message box being displayed. A single type of event, DeviceError, is generated when there is some kind of hardware failure, allowing error handling for hardware failure to be encapsulated rather than scattered over many error handlers.

The system requires applications to interact with it in a well defined way. Even small transgressions are detected and error responses generated; when this happens, the current environment is abandoned and the application is terminated.

This is based on the well known software engineering approach of assertion; however, the system's assertion differs from common practice by asserting absolutely all disallowed cases, whether serious or not. As a result of this strategy of escalating errors to maximum seriousness, errors are found earlier at development time or at system test time and never allowed to reach a live environment. Although there is a risk of the application reporting a fatal error in the field for a relatively minor problem, this strategy achieves a particularly high level of robustness in comparison to prior art software applications.

An additional error-handling feature is provided by the way in which the system deals with tracing. In software engineering, tracing is typically enabled only when a problem is suspected; however, this can affect the dynamics of a program, making it harder to find bugs. This is a particularly substantial problem when dealing with time-critical ATM/kiosk applications. However, if conventional tracing was simply always enabled throughout both development and operation of the ATM/kiosk, there would be both performance problems due to, for example, the time spent writing to a hard drive and large quantity of disk space required to store the large number of trace events that will typically be produced.

The middleware software provides a trace control which records all trace events of the application and underlying middleware and is always enabled. Performance problems are dealt with by writing trace data to memory and writing to disk only when the ATM/kiosk is idle. Cash-dispensing machines and kiosks go through an idle cycle between two users which provides sufficient time to write to disk, even when people are queuing at the machine. Disk space problems are eliminated by using a ring buffer of fixed file size, allocated at boot-up and constant in size throughout operation. When the buffer is full, the oldest data is overwritten, thereby leaving a continual record of the most recent events.

As a result of this tracing strategy it is much easier to understand one-off or rare problems, which is not easily done when tracing is enabled only once a problem has been reported.

Furthermore, some ATM/kiosk vendors provide a limited amount of non-volatile RAM. When this is provided, the trace control writes the most recent trace information to this RAM in a ring buffer fashion. As this is very quick, it does not produce any performance problems. However, if the ATM/kiosk freezes up or crashes, the RAM contains the trace of what happened immediately before.

In addition to the traditional way that ActiveX® fires events to the container, the device and self-service controls are able to queue up events and return them one by one when requested. This allows C++ applications to be written in a procedural fashion rather than simply in an event driven fashion. By queuing up these events and delivering them to the application only on demand, the system allows procedural code to be written and makes it easier to develop and maintain the complex logic required in self-service applications.

Important self-service controls are described below:

Watchdog control: runs in a separate Windows NT® process and reboots the ATM/kiosk if the application crashes. This is achieved by regularly polling the application to check that it is functioning correctly. This control can also be used to daily reboot the ATM/kiosk. The watchdog can monitor multiple applications on a single ATM.

System Escape control: used to reboot the ATM/kiosk. Exits in a customisable manner. This control ensures that cached data (eg in the DataCollect control and the Trace control) is flushed to disk before rebooting.

DataCollect control: allows application to collect raw data for statistical purposes. It logs and timestamps the various events. As with the Trace control, it logs to memory and then stores on hard disk only when the ATM/kiosk is idle due to the time required to write to the hard disk. Storage by this control is of a fixed size allocated at start-up and remaining constant throughout operation. Storage is in the form of a ring buffer. Typically, the collected data would be exported to a remote location for analysis.

Trace control: described above.

Scratchpad control: described above.

Supervisor application: run simultaneously as a separate application. This means that on an ATM/kiosk with a rear screen, the operator can interact with the ATM/kiosk without taking the machine offline. It allows the operator to access statistics etc. while the machine is still being used. Alternatively, the machine may be taken off-line for intrusive maintenance. In this case, the supervisor application provides an off-line mode with a limited subset of the on-line features.

Security control: described above.

Registry control: allows Windows NT® registry to be manipulated by the application.

DirectoryTree control.

Application Launcher control.

INI file control: allows Windows® INI files to be read from the browser.

Timed FTP. This allows statistics files and trace files to be sent via the FTP mechanism on a timed basis to an offsite location. (eg daily or weekly).

Key capture control: allows special Windows® key combinations such as ctrl-alt-del and alt-tab to be captured where a full PC keyboard is provided.

Popup suppression control. Monitors and captures popup windows originating from the operating system. This makes it easier to allow software components from other vendors to be used in self-service applications. Most third-party software is not intended for self-service applications and expects to be able to interact with the user through popup windows. This is unacceptable in a self-service environment where the main application must have a complete monopoly over the user dialog. This control alleviates this problem by monitoring popups and rapidly executing a pre-determined sequence of tasks, for example hiding the popup and pressing the OK button.

Global config file control. Allows configuration data for ATM networks to be centrally held in a single distributable file. Each ATM/kiosk can query this control to retrieve the configuration data which is specific for that ATM/kiosk. This allows variation between individual ATMs/kiosks to be handled in a global way.

Telephony control. Allows modems and telephone handsets to be integrated.

SSMS control. Allows software to be downloaded and installed in a controlled manner. This control checks for installation failures and allows the system to recover to a well defined state.

Screensaver control. This control allows the application to jump to a defined web page if the user has been inactive for more than a pre-determined time.

Multiple language control. This control allows the language on a web page to be dynamically modified. It does this by retrieving text strings and graphics from a database on the kiosk. This means that the user may change languages from any browser page—and therefore at any stage of the application.

Clock synch control. This allows the application to synchronize its clock with a server clock, taking into account possible differences in timezone between kiosk and server and taking into account the possibility of large timelags for communication between the kiosk and the server.

Use of the self-service controls plus additional features of the system and underlying operating system allow ATMs/kiosks to be managed from a remote location. For example, the system supports:

Daily software downloads from a remote web server.
Daily reboot and system check.
Daily FTP of statistics data to a remote monitoring station.
Daily FTP of trace data to a remote monitoring system.
Regular health checks of the kiosk (typically every 5 minutes).
Sending a regular "heartbeat" message to a remote monitoring station. Monitoring of this message allows the fact that the device is continually functioning to be monitored.
Allowing direct secure access to the kiosk over a network, for example the Internet, from a remote location.
Allowing software maintenance over a network, for example the Internet, from a remote location.
Allowing manual reboot of the kiosk over a network, for example the Internet, from a remote location.

Although hardware is accessed via the WOSA XFS standard, which assigns a different number to each command, the controls have differently named methods and events associated with each operation, making application development easier. WOSA commands may typically generate 30-50 events. This wastes time for the application developer and increases the possibilities of error. The middleware reduces the set of possible outcomes to a small number of clearly named completion events, making it easier for the application developer to write reliable code quickly. Outcomes which can only happen if there is a bug in the application cause fatal errors to be triggered.

The system automatically opens a WOSA XFS session when a device control is first used; there is therefore no need to manually call an Open method. WOSA sessions are maintained between pages through the use of event threads, described above.

All WOSA XFS methods require a timeout to be provided; however, this is not appropriate or meaningful for the majority of commands in this application. The middleware requires a timeout to be supplied only where it is meaningful to do so. WOSA also allows cancel commands to be sent after any other command. Not all ATM functions can really be cancelled and the middleware only provides cancel commands where cancellation can actually be achieved. The request IDs returned by WOSA for each asynchronous operation are abstracted out by the middleware. WOSA is accessed only by the middleware and not directly by the application.

Clearly the preferred embodiment described above may readily be adapted to operate with any operating system or component system.

Further modifications and improvements may be incorporated without departing from the scope of the invention herein intended.

The invention claimed is:

1. A method for controlling an ATM or kiosk, comprising the steps of:
providing an embedded software application at the ATM or kiosk;
providing at least one device of at least one device type at the ATM or kiosk;
providing middleware software at the ATM or kiosk for interfacing the application with the at least one device, wherein the middleware comprises a software component for each device type, each software component embodying an ability to interpret specific capabilities of a plurality of devices belonging to the device type that the software component is for; and
controlling within the ATM or kiosk by the software application, through each component, devices belonging to the device type that the component is for, such that the middleware software compensates for capabilities specific to the at least one device and isolates the application from differences between devices.

2. The method of claim 1, further comprising providing said ATM or kiosk with a data communications interface over which said ATM or kiosk communicates.

3. A method for controlling an ATM or kiosk according to claim 2 further comprising the step of enabling said software application to communicate over said communications interface through a software component.

4. A method for controlling an ATM or kiosk according to claim 2 further comprising configuring a plurality of ATMs or kiosks, and wherein configuration data for said step of configuring is centrally held in a distribution file.

5. A method for controlling an ATM or kiosk according to claim 1 wherein the software component is for performing standardized device functions.

6. A method for controlling an ATM or kiosk according to claim 5, further comprising providing said ATM or kiosk with a customizable user interface.

7. A method for controlling an ATM or kiosk according to claim 6 further comprising the step of constructing said user interface using common web authoring tools.

8. A method for controlling an ATM or kiosk according to claim 6 wherein said software component is independent of said user interface.

9. A method for controlling an ATM or kiosk according to claim 8, further comprising providing said ATM or kiosk with a plurality of software components, at least one of which comprises a capabilities interface.

10. A method for controlling an ATM or kiosk according to claim 9 wherein the capabilities interface communicates the capabilities of the software component.

11. A method for controlling an ATM or kiosk according to claim 9 wherein the application and the software components are concurrently operable.

12. A method for controlling an ATM or kiosk according to claim 5 wherein the software component is constructed with an event generating capability and wherein said software component is operable in a selectable mode in which events are queued up and delivered to the application on demand.

13. A method for controlling an ATM or kiosk according to claim 1 wherein said middleware software provides service in accordance with at least one software standard for interacting with different hardware systems.

14. A method for controlling an ATM or kiosk according to claim 13 wherein said at least one software standard is selected from a group consisting of WOSA XFS, OPOS, OFX, TOPEND®, ActiveX®, Javabeans, SNMP.

15. A method for controlling an ATM or kiosk according to claim 1 wherein all errors and transgressions are asserted by the middleware software.

16. A method for controlling an ATM or kiosk according to claim 1 further comprising the step of the middleware software writing trace data to memory and then copying the trace data to disk only when the ATM or kiosk is idle.

17. A method for controlling an ATM or kiosk according to claim 1 further comprising providing said ATM or kiosk with a web browser.

18. A method for controlling an ATM or kiosk according to claim 17 where said ATM/kiosk control application is operable from within the environment of said web browser.

19. A method for controlling an ATM or kiosk according to claim 18 wherein said web browser provides support for software distribution.

20. A method for controlling an ATM or kiosk according to claim 18 wherein said at least one software component is contained in a web browser frame provided at said ATM or kiosk and wherein said at least one software component is operable to detect events which must be responded to upon occurrence.

21. A method for controlling an ATM or kiosk according to claim 17 wherein said middleware software comprises a plurality of COM components having a scriptable ActiveX® interface.

22. A method for controlling an ATM or kiosk according to claim 17 wherein said middleware software comprises a plurality of Javabeans™ components having a scriptable interface.

23. A method for controlling an ATM or kiosk according to claim 17 wherein said web browser communicates with conventional web sites to be displayed by the ATM or kiosk.

24. A method for controlling an ATM or kiosk according to claim 17 wherein the middleware software allows or disallows access to particular web sites according to a rule database.

25. A method for controlling an ATM or kiosk according to claim 17 wherein the middleware software customizes timeout of the display of individual interne web sites.

26. A method for controlling an ATM or kiosk according to claim 1 wherein the ATM or kiosk enables the software application and middleware to be altered across a network by an authority.

27. A method for controlling an ATM or kiosk according to claim 1 wherein the ATM or kiosk communicates status information to a remote station.

28. A method for controlling an ATM or kiosk according to claim 1 wherein said at least one software component encapsulates software logic required for performing at least a portion of a transaction.

29. A method for controlling an ATM or kiosk according to claim 1 wherein said at least one software component provides abstraction of details of a device controlled by said software component.

30. A method for controlling an ATM or kiosk according to claim 1 further comprising the step of creating a separate thread for each of a plurality of software components.

31. A method for controlling an ATM or kiosk according to claim 5 wherein at least one of said software components implements an OFX interface or a portion thereof, to facilitate communication with an OFX server.

32. A method for controlling an ATM or kiosk according to claim 1 wherein said middleware software provides generic error handlers.

33. A method for controlling an ATM or kiosk according to claim 1 wherein said software application runs on a Microsoft Windows NT operating system.

34. A method for controlling an ATM or kiosk according to claim 1 wherein said ATM or kiosk is operated by a first organization, wherein said ATM/kiosk control application is provided by a second organization, and wherein said software application provides a transaction type different than the transaction type associated with said first organization.

35. A method for providing transaction services according to claim 1, further comprising the step of creating an event thread associated with each software component for insuring that device states persist from a page of the application to another page of the application.

36. A method for controlling an ATM or kiosk according to claim 1, further comprising the step of encapsulating essential software logic of the software component so that an associated user interface is freely defined.

37. A method for controlling an ATM or kiosk according to claim 1 in a network comprising a plurality of ATMs or kiosks each having at least one device of at least one device type, the at least one device having capabilities, wherein the capabilities of a device of at least one device type in at least one of the ATMs or kiosks are different from the capabilities of a device of the same device type in at least one other of the ATMs or kiosks, and wherein different services are provided for the different device capabilities.

38. An ATM or kiosk comprising:
an embedded software application;
at least one device of at least one device type; and
middleware software adapted to interface the application with the at least one device, the middleware software comprising a software component for each device type, each software component embodying an ability to interpret specific capabilities of a plurality of devices belonging to the device type that the software component is for, each component being adapted to control devices belonging to the device type that the software component is for within the ATM or kiosk by the software application, such that the middleware software compensates for capabilities specific to the at least one device and isolates the application from differences between devices.

39. The ATM or kiosk of claim 38 further comprising a data communications interface and wherein said ATM or Kiosk is adapted to communicate over said data communications interface.

40. The ATM or kiosk of claim 38 wherein the software components are for performing standardized device functions.

41. The ATM or kiosk of claim 40, comprising a customizable user interface.

42. The ATM or kiosk of claim 41, wherein said user interface is adapted to be constructed using common web authoring tools.

43. The ATM or kiosk of claim 41 wherein said software components are independent of said user interface.

44. The ATM or kiosk of claim 43 further comprising a plurality of software components, at least one of which comprises a capabilities interface.

45. The ATM or Kiosk of claim 44 wherein said at least one software component provides abstraction of details of a device controlled by said software component.

46. The ATM or kiosk of claim 44 wherein each of a plurality of the software components comprises means for creating a separate thread.

47. The ATM or kiosk of claim 44, wherein at least one of the software components comprises means for enabling said software application to communicate over said communication interface.

48. The ATM or kiosk of claim 44 wherein at least one of said software components implements an OFX interface or a portion thereof, to facilitate communication with an OFX server.

49. The ATM or kiosk of claim 44 wherein the capabilities interface can communicate the capabilities of the software component.

50. The ATM or kiosk of claim 44 wherein the software application and the software components are concurrently operable.

51. The ATM or kiosk of claim 38 wherein said software component is constructed with an event generating capability and wherein said software component is operable in a selectable mode in which events are queued up and delivered to the application on demand.

52. The ATM or kiosk according to claim 38 wherein said middleware software is adapted to provide service in accordance with at least one software standard for interacting with different hardware systems.

53. The ATM or kiosk according to claim 52 wherein said at least one software standard is selected from a group consisting of WOSA XFS, OPOS, OFX, TOPEND, ActiveX®, Javabeans, SNMP.

54. The ATM or kiosk of claim 38 wherein said ATM/kiosk control application is operable from within a web browser environment.

55. The ATM or kiosk of claim 54 wherein a web browser provides support for software distribution.

56. The ATM or kiosk of claim 54 further comprising a web browser frame containing at least one software component operable to detect events which must be responded to upon occurrence.

57. The ATM or kiosk of claim 38 wherein said middleware software comprises a plurality of COM components having a scriptable ActiveX® interface.

58. The ATM or kiosk of claim 38 wherein said middleware software comprises a plurality of Javabeans™ components having a scriptable interface.

59. The ATM or kiosk of claim 38 wherein a web browser is adapted to communicate with conventional web sites to be displayed by the ATM or Kiosk.

60. The ATM or kiosk of claim 38, adapted to allow the ATM/kiosk software application and middleware to be altered across a network by an authority.

61. The ATM or kiosk of claim 38, adapted to communicate status information to a remote station.

62. The ATM or Kiosk of claim 38 wherein said at least one software component encapsulates software logic required for performing at least a portion of a transaction.

63. The ATM or kiosk of claim 38 wherein said middleware software provides generic error handlers.

64. A network comprising a plurality of ATMs or kiosks according to claim 38, wherein configuration data for configuring the ATMs or kiosks is centrally held in a distribution file.

65. The ATM or kiosk of claim 38 wherein said ATM/kiosk control application runs on a Microsoft Windows NT operating system.

66. A network comprising a plurality of ATMs or kiosks according to claim 38, one or more networking means and one or more application servers.

67. A network comprising a plurality of the ATMs or kiosks according to claim 38, wherein the capabilities of a device of at least one device type in at least one of the ATMs or kiosks are different from the capabilities of a device of the same device type in at least one other of the ATMs or kiosks.

68. An Extranet formed by combining a plurality of networks of ATMs or kiosks according to claim 66.

69. An Extranet according to claim 68 provided with a security mechanism which limits the hardware functionality available to individual software applications.

70. A method for providing transaction services in an ATM or Kiosk having at least one transaction device of at least one transaction device type, the at least one transaction device having capabilities, comprising the steps of:
controlling said ATM or Kiosk by at least one software application and an operating system, both of which are installed in the ATM or Kiosk;
wherein the at least one software application interacts with said at least one transaction device of said transaction device type through a programming interface of middleware software comprising transaction objects providing transaction services; and
wherein the transaction services provided by the transaction objects depend on the transaction device type, and the transaction objects have the ability to provide transaction services for said at least one transaction device of said transaction device type, as well as for a transaction device of said transaction device type that has capabilities different from the capabilities of said at least one transaction device, but the programming interface of the transaction objects is independent of the capabilities of the transaction device.

71. An ATM or Kiosk comprising
at least one transaction device of at least one transaction device type;
at least one software application and an operating system installed in the ATM or Kiosk, the at least one software application and the operating system controlling and receiving information from said at least one transaction device type;
a programming interface of middleware software through which the at least one software application and the operating system control and receive information from said at least one transaction device type, wherein the programming interface of middleware software comprises transaction objects providing transaction services, wherein the transaction services provided by the transaction objects depend on the transaction device type, and the transaction objects have the ability to provide transaction services for said at least one transaction device of said transaction device type, as well as for a transaction device of said transaction device type that has capabilities different from the capabilities of said at least one transaction device, but the programming interface of the transaction objects is independent of the capabilities of the transaction device.

* * * * *